United States Patent [19]

Kendall

[11] Patent Number: 5,769,004
[45] Date of Patent: Jun. 23, 1998

[54] STAND INTEGRATED TRIPOD RISER

[76] Inventor: Charles S. Kendall, P.O. Box 10893, Alexandria, Va. 22310

[21] Appl. No.: 837,824
[22] Filed: Apr. 22, 1997
[51] Int. Cl.⁶ .................................................. A47B 57/00
[52] U.S. Cl. .............................. 108/59; 108/115; 108/94
[58] Field of Search ............................ 108/59, 115, 128; 248/165, 166, 160, 435, 170, 108.6, 108.7

[56] References Cited

U.S. PATENT DOCUMENTS

| | | | |
|---|---|---|---|
| 3,080,193 | 3/1963 | Nimmo | 108/115 X |
| 3,162,149 | 12/1964 | Hansen | 108/115 X |
| 5,205,223 | 4/1993 | Ball et al. | 108/115 X |
| 5,445,085 | 8/1995 | Westerburgen | 108/115 |
| 5,463,945 | 11/1995 | Kendall | 108/115 X |
| 5,653,179 | 8/1997 | Kendall | 108/128 X |

FOREIGN PATENT DOCUMENTS

| | | | |
|---|---|---|---|
| 65233 | 11/1892 | Germany | 108/115 |
| 191882 | 1/1923 | United Kingdom | 108/115 |
| 663478 | 12/1951 | United Kingdom | 108/115 |

*Primary Examiner*—Jose V. Chen
*Attorney, Agent, or Firm*—Randy W. Lacasse

[57] ABSTRACT

A tripod riser support system is integrated directly within a portable stand thus creatinga a more compact, lighter and less expensive tripod riser. A portable stand is used as a support base for both an individual and for support of a tripod by the attachment of additional tripod receiving channels. A user would transport the device to a location where they desire to film a particular event. The legs of the stand would be unfolded and the tripod support channels extended to form three symmetric channels separated by 120 degrees from each other.

12 Claims, 3 Drawing Sheets

STAND INTEGRATED TRIPOD RISER

BACKGROUND OF THE INVENTION

1. Field of Invention

The present invention relates generally to the field of camera equipment. More specifically, the present invention is related to a tripod riser system incorporated within a portable stand structure.

2. Discussion of Prior Art

The prior art comprises portable tripod riser U.S. Pat. Nos. 5,463,945 and 5,473,996 and co-pending application Ser. No. 08/568,240, commonly owned by Charles S. Kendall, hereby incorporated by reference. The present invention uses the basic functions as taught in the earlier patents in a new and different configuration not previously taught or suggested by the prior art.

Whatever the precise merits, features and advantages of the above cited references, none of them achieve or fulfills the purposes of the present invention. Accordingly, it is an object of the present invention to provide for a new and useful tripod riser.

It is another object of the present invention to integrate a tripod riser directly within a portable stand.

It is an additional object of the present invention to make said above device lightweight and easy to carry.

It is an additional object of the present invention to make said above device quick to set-up and take down.

It is an additional object of the present invention to make said above device sturdy to remove unwanted vibrations while in use.

These and other objects are achieved by the detailed description that follows .

SUMMARY OF THE INVENTION

The present invention improves on the prior art by integrating a tripod riser support system directly within a portable stand thus creating a more compact, lighter and less expensive tripod riser. In addition, multiple leg, binding and attaching embodiments are envisioned. The device uses a portable stand as disclosed in co-pending patent application filed Mar. 28, 1997, entitled, "Integrated Tripod Riser", hereby incorporated by reference. Using this unique stand as a support base for an individual was previously disclosed in the cited co-pending application. What was not taught was the use of the stand for partial support of a tripod and attachment of additional support legs. A user would transport the device to a location where they desire to film/ photograph a particular event. The legs of the stand would be unfolded and the tripod support channels extended to form three symmetric channels separated by 120 degrees from each other. The corresponding three tripod legs would be placed in the symmetric channels thus elevating the tripod. A user would then step up onto the stand support to film/photograph the desired event.

DESCRIPTION OF THE PREFERRED EMBODIMENTS

Figure 1A:
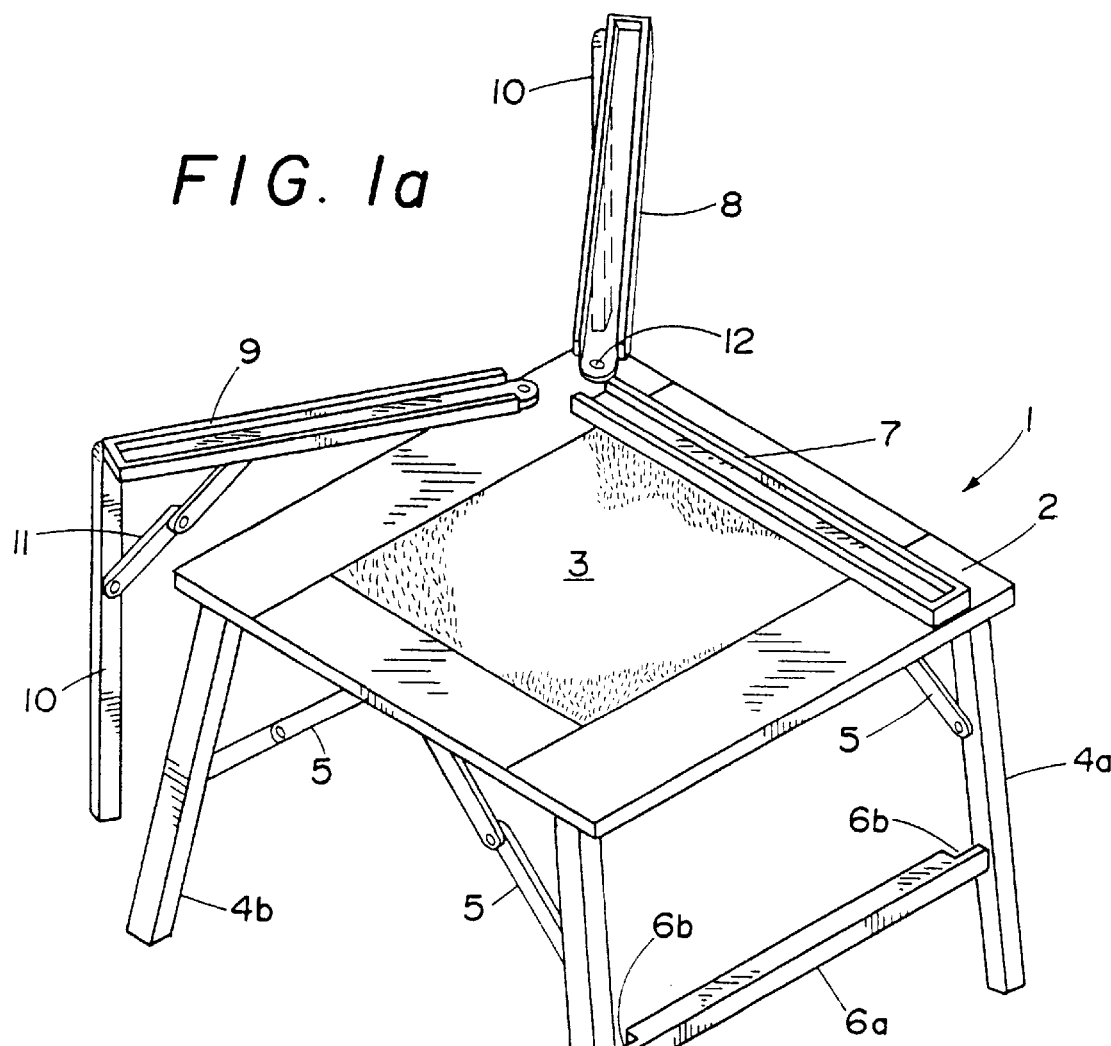
FIG. 1a illustrates the structure of the present invention in a setup position.

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as a exemplification of the principles of the invention and the associated functional specifications of the materials for its construction and is not intended to limit the invention to the embodiment illustrated. Those skilled in the art will envision many other possible variations within the scope of the present invention.

FIG. 1a illustrates a portable stand 1 comprising a frame top section 2 extending around the periphery of the stand top. Within the center of the top is a lower recessed center section 3 which may have a textured surface and/or an added layer of carpet or rubber. The center is textured, etc. to provide a non-slip, tactile feedback surface for the user while standing thereon. When a user stands on the top surface, preferably in the center, movement of the feet from the center towards the outer frame 2 and subsequent edges will be detected by either a change in texture and/or a change in height variation. Two pairs of support legs 4a and 4b (far leg not illustrated) are attached to the underside of the top section by folding braces 5 (far brace not illustrated). Legs 4a include a cross support 6a which acts as a step for the user to step up onto the top while using the present invention. Legs 4a are connected slightly to the exterior of legs 4b such that they fold within each other when folded in the closed position. Small cutout sections 6b retain legs 4b in the closed position.

On top of the stand is a tripod leg receiving channel 7 affixed thereto. This channel is permanently attached to the top in the preferred embodiment. It is envisioned, however, that the channel 7 can be retained by various methods which are rigid but temporary in nature without departing from the scope and spirit of the present invention. For example, channel 7 can include male lugs which can be locked in mated coaction with cutout receiving sections in the top 2 or other equivalent fastening methods. Channel 7 can also be rotatable at one end to vary its placement relative to the other two tripod leg receiving channels 8 and 9 during transport.

Figure 1B:
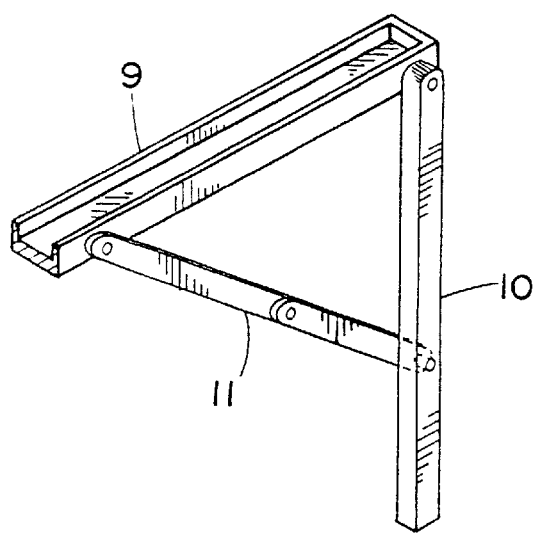
FIG. 1b illustrates a reverse view of either of said support channels 8 or 9.
Figure 3:
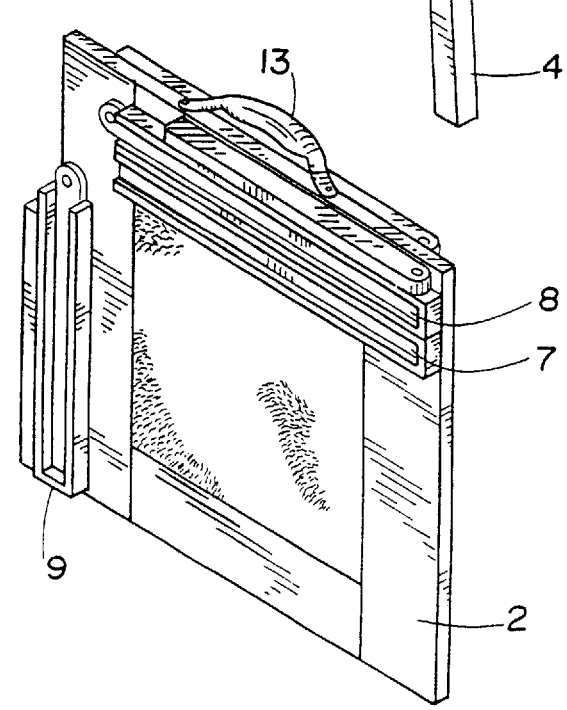
FIG. 3 illustrates the device in a closed transport position.

Second and third tripod leg receiving channels 8 and 9 are attached to the stand by pins 12 and are rotatable about the axis of the pins 12. Tripod leg receiving channels 8 and 9 further comprise folding support legs 10 attached thereto by hinges 11 (FIG. 1b). Second leg receiving channel 8 can be connected by hinge 22 to allow it to be folded onto the stand in the transport configuration. A handle 13 is located on one side of the top section 2 to aid in carrying during transport (FIG. 3).

In operation, a user would transport the stand in a closed position (FIG. 3) to a desired location and be able to quickly set up the stand. The legs 4a and 4b would be unfolded from the closed position and locked into a fully extended position. Leg receiving channel 8 would then be extended 120 degrees with respect to fixed channel 7 and its support leg 10 unfolded and hinge locked into a fully extended position. Leg receiving channel 9 would then be extended 30 degrees and its support leg 10 locked into position as was leg receiving channel 8. A user would then place the three legs of a tripod into the three receiving channels 7, 8 and 9 and stand onto the stand with the camera attached to the tripod facing the direction of channel 8. Of course, various camera shots may dictate other camera positions other than that disclosed in the preferred embodiment.

Figure 2:
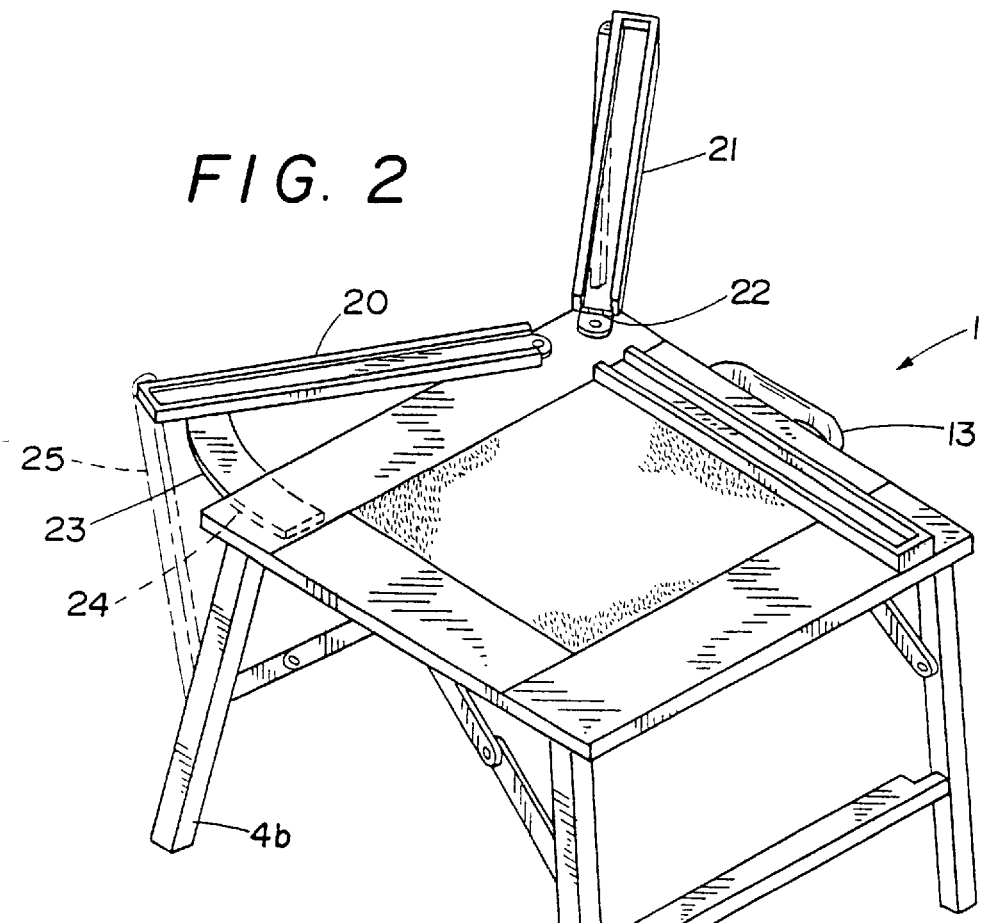
FIG. 2 illustrates second and third embodiments of FIG. 1.

FIG. 2 illustrates alternative support embodiments. In a secondary embodiment, leg receiving channel 20, equivalent to 9, is supported by an arcuate sliding brace 23. The brace 23 can be receivable into a cavity 24 within the interior of top 2 or into a channel receiving section (not shown) located on the top surface of top section 2. Other braces which would support the receiving channel 20 in relative rotational movement are deemed to be within the scope of the present invention. Receiving channel 21, equivalent to 8, could also use a similar longer sliding brace 23 but would be less structurally sound than the shorter travel of receiving channel 20 brace.

In a tertiary embodiment, FIG. 2, a support leg 25 is substituted for the brace 23 and is connected permanently from the side or underneath of channel 20 to the support leg 4b. The leg can swing down in a similar manner as shown in FIG. 1b or be attached by various equivalent methods. The leg is approximately 10–14 inches long and attaches during setup, using conventional attachment methods, to leg 4b approximately half-way between the foot and the table top. The specific size and shape of support leg 25 may be chosen as it relates to the specific size and design of the table. For example, a taller stand 1 would require a longer support leg 25. A heavyweight stand would require an equivalent heavy duty support.

As with the preferred embodiment, a suitable handle 13 may be placed along any exterior edge to facilitate carrying. In addition, in all embodiments, legs 4a/4b and/or receiving channels 7, 8 and 9 can be secured by a suitable fastening means (not shown), as is known in the art, during the closed transport position.

Figure 4:
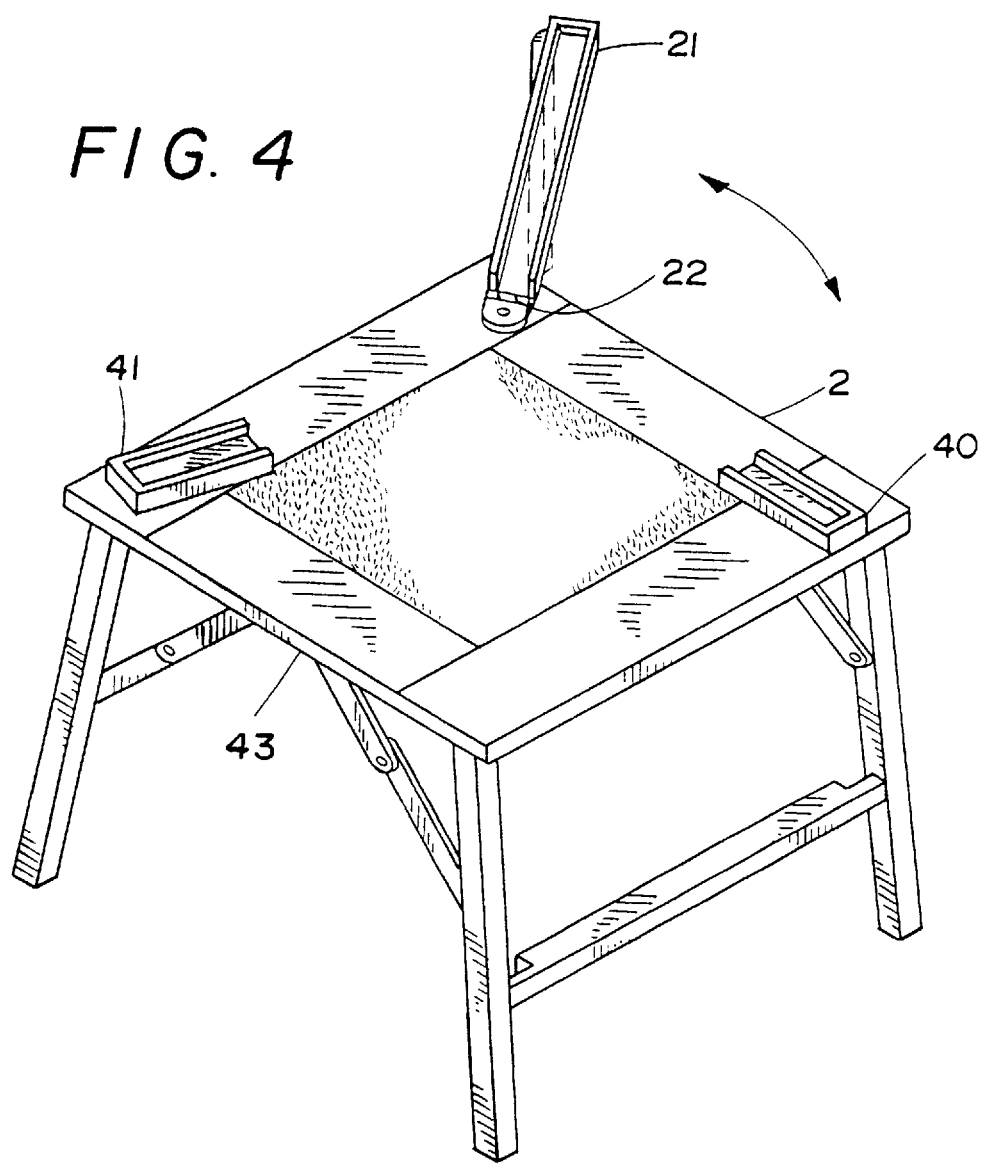
FIG. 4 illustrates a fourth embodiment of the present invention.

FIG. 4 illustrates a fourth embodiment wherein two of the three tripod receiving channels 40 and 41 are integrated directly into the stand top 2. The third tripod receiving channel 21 remains similar to FIG. 2 and can be rotated or hinged during transport. The specific size of the dimensional length 43 can be varied as well as the angle of element 41 to comply with the required 120 degree spacing with respect to the remaining tripod receiving channels.

CONCLUSION

A system and method has been shown in the above embodiments for the effective implementation of a stand with integrated tripod riser. While various preferred embodiments have been shown and described, it will be understood that there is no intent to limit the invention by such disclosure, but rather, it is intended to cover all modifications and alternate constructions falling within the spirit and scope of the invention as defined in the appended claims. For example, the present invention should not be limited by size, materials, connection methods, leg styles, handle position or composition, locking structures or surface textures.

I claim:

1. A portable tripod riser, transportable in a closed configuration and setup in an open configuration, comprising:
    a stand having a top surface and a plurality of folding legs;
    a first tripod receiving channel rigidly attached to a top side of said stand;
    a second tripod receiving channel attached to said top side of said stand in close proximity to said first tripod receiving channel, rotatable within the horizontal plane of said first tripod receiving channel;
    a third tripod receiving channel attached to said top side of said stand in close proximity to said first tripod receiving channel, rotatable axially within a horizontal plane of said first tripod receiving channel, and
    wherein said second and third tripod receiving channels are displaced with respect to said first tripod receiving channel during setup to equidistantly receive the legs of a tripod.

2. A portable tripod riser as per claim 1, wherein said first tripod receiving channel is permanently attached to said stand.

3. A portable tripod riser as per claim 1, wherein said second tripod receiving channel has a folding support leg attached thereto.

4. A portable tripod riser as per claim 1, wherein each of said second and third tripod receiving channels has a folding support leg attached thereto.

5. A portable tripod riser as per claim 1, wherein said second tripod receiving channel has a sliding brace support attached thereto.

6. A portable tripod riser as per claim 5, wherein said third tripod receiving channel has a folding support leg attached thereto.

7. A portable tripod riser as per claim 5, wherein said second and third tripod receiving channels have a sliding brace support attached thereto.

8. A portable tripod riser as per claim 1, wherein said third tripod receiving channel has a hinge for folding, instead of rotating, the third tripod receiving channel onto said top during a transport configuration of said tripod riser.

9. A portable tripod riser as per claim 1, wherein said second tripod receiving channel further comprises a support leg connected thereto and attached during setup to one of said stand folding legs.

10. A portable tripod riser, transportable in a closed configuration and setup in an open configuration, comprising:
    a stand having a top surface and a plurality of folding legs;
    a first tripod receiving channel integrated within a top side of said stand;
    a second tripod receiving channel integrated within a top side of said stand and offset 120 degrees from said first tripod receiving channel;
    a third tripod receiving channel attached to said top side of said stand, offset 120 degrees from said first tripod receiving channel and rotatable axially within a horizontal plane of said first tripod receiving channel, and
    wherein said first, second and third tripod receiving channels receive the legs of a tripod during setup in said open configuration.

11. A portable tripod riser as per claim 10, wherein said third tripod receiving channel has a hinge for folding, instead of rotating, the third tripod receiving channel onto said stand top during a transport configuration of said tripod riser.

12. A portable tripod riser, transportable in a closed configuration and setup in an open configuration, comprising:
    a stand having a top section and a plurality of folding legs;
    two or more tripod receiving channels integrated within said top section of said stand;
    each of said two or more tripod receiving channels offset 120 degrees from each other and located in a common horizontal plane during setup;
    wherein at least one of said two or more tripod receiving channels is integrated into a top surface of said top section, and
    wherein said two or more tripod receiving channels receive the legs of a tripod during setup in said open configuration.

* * * * *